Sept. 24, 1935.  E. ANDERSON  2,015,096
TRANSMISSION MECHANISM
Filed Oct. 9, 1931  4 Sheets-Sheet 1
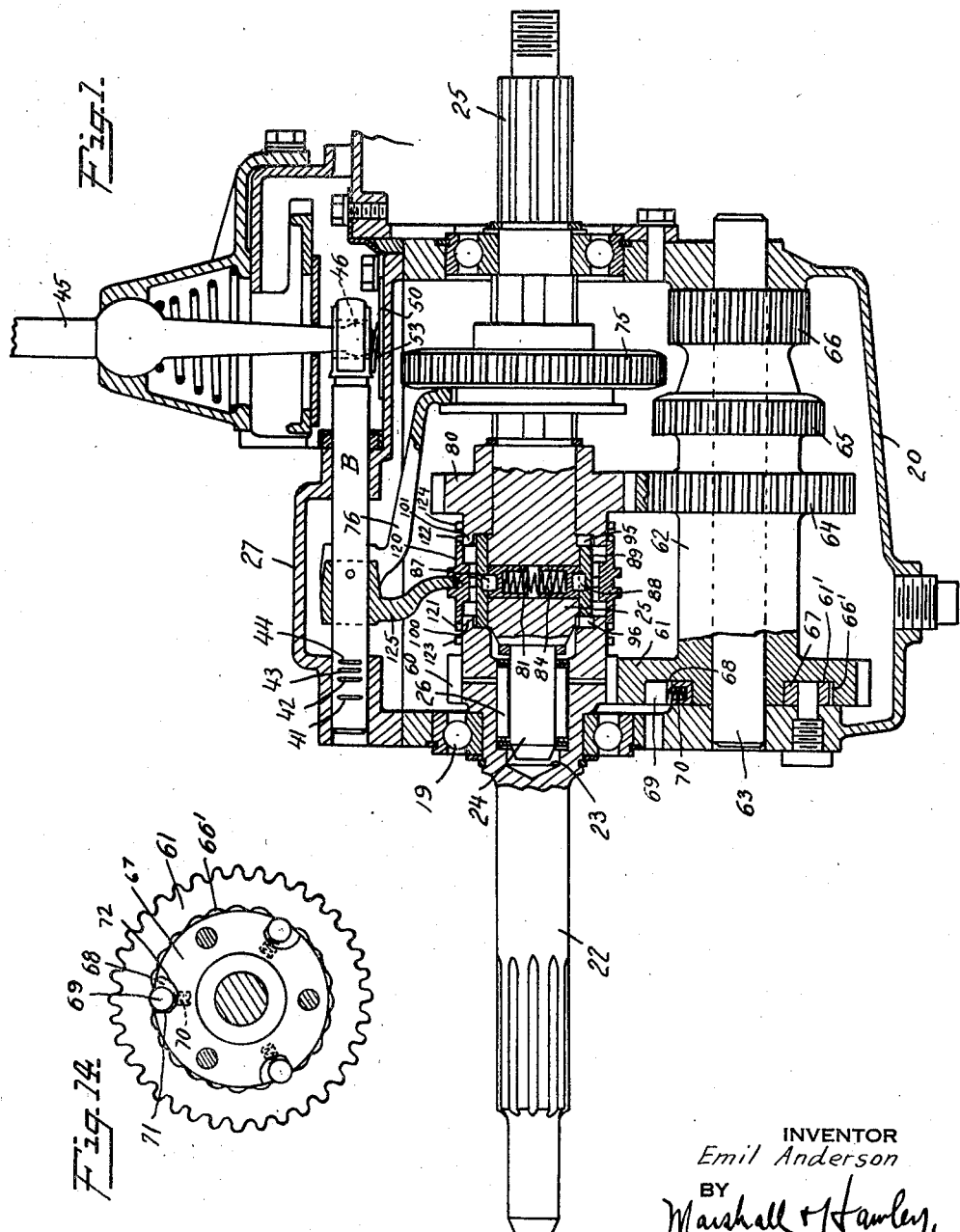
INVENTOR
Emil Anderson
BY
Marshall & Hawley,
ATTORNEYS

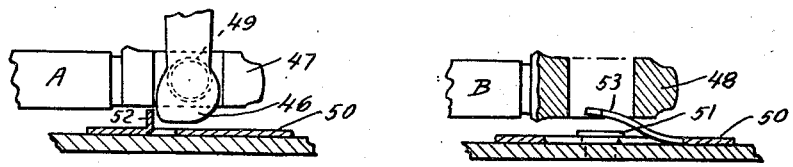

Sept. 24, 1935.  E. ANDERSON  2,015,096
TRANSMISSION MECHANISM
Filed Oct. 9, 1931  4 Sheets-Sheet 3
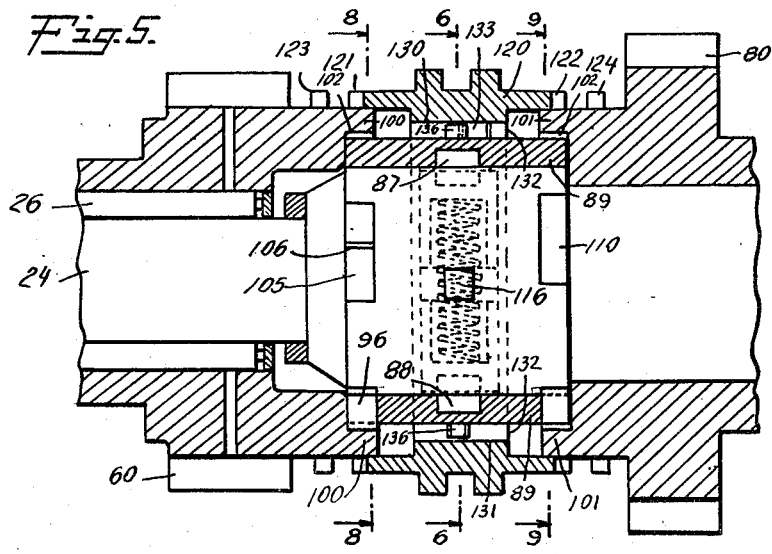
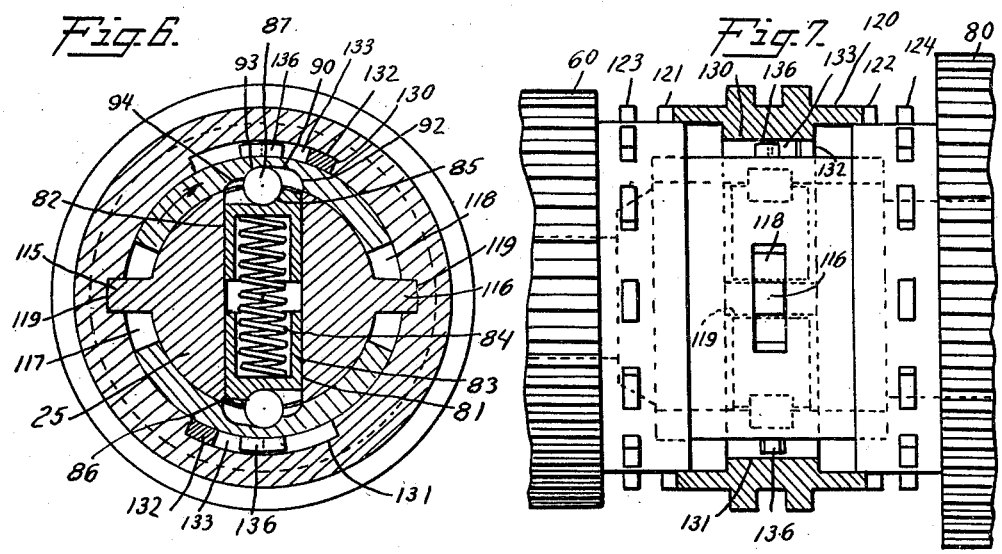
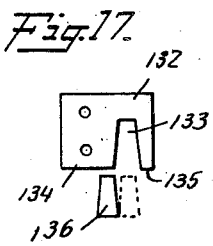
INVENTOR
Emil Anderson
BY
Marshall & Hawley.
ATTORNEYS

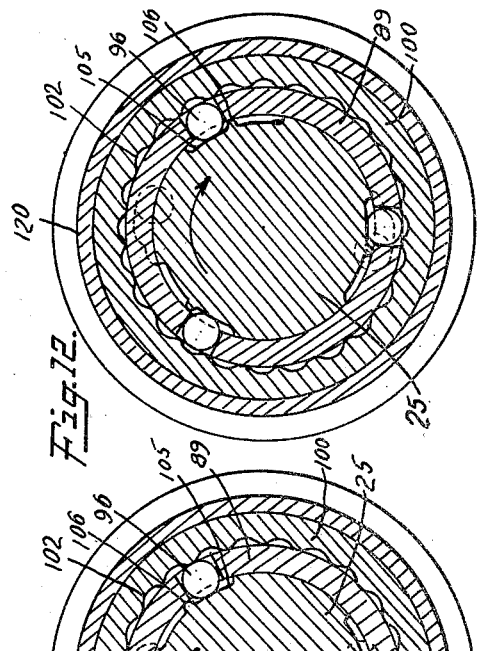
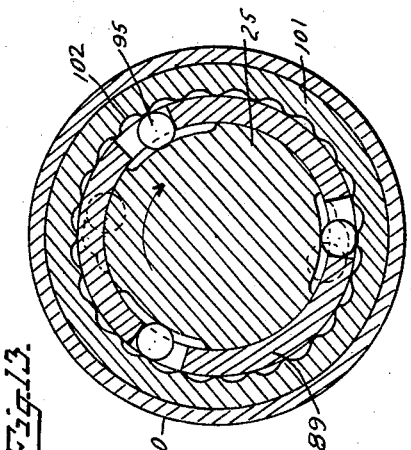
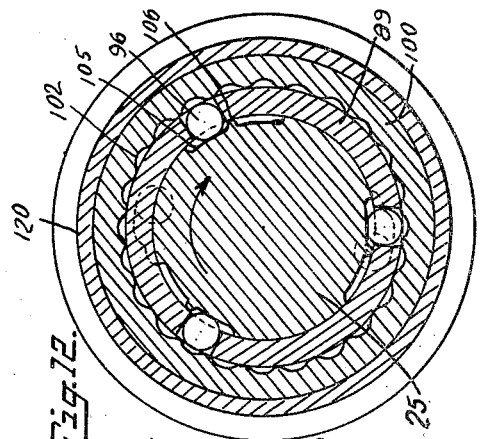
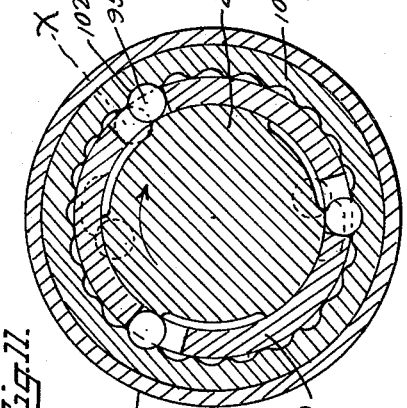
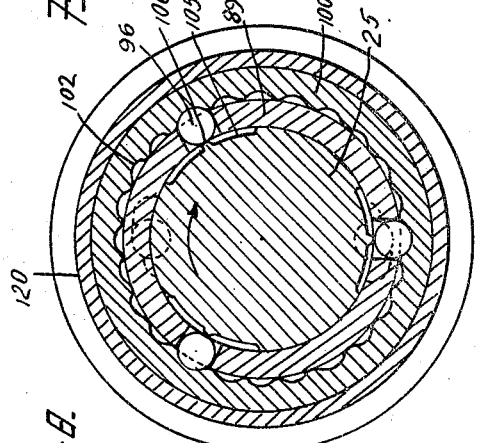
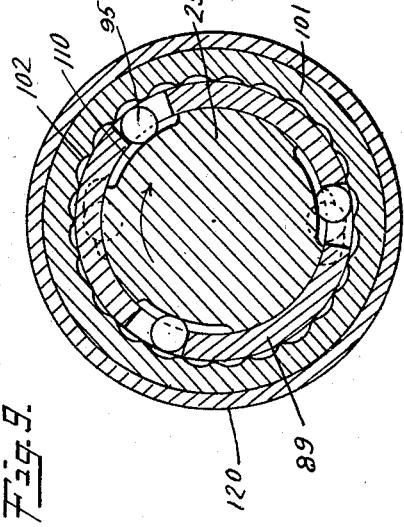

Patented Sept. 24, 1935

2,015,096

UNITED STATES PATENT OFFICE 2,015,096

TRANSMISSION MECHANISM

Emil Anderson, Briarcliff Manor, N. Y.

Application October 9, 1931, Serial No. 567,840

26 Claims. (Cl. 74—337)

This invention relates to transmission mechanisms and particularly to motor vehicle transmissions.

Various forms of automatic torque controlled gear shifts have been proposed but in most, if not all of such arrangements, the structures have been highly complicated, bulky, expensive and impractical. Furthermore, such arrangements have necessitated an entirely new design of transmission and have been operated in a manner differing greatly from the conventional operation of a variable speed transmission.

Another feature that has recently gained the approval of motor vehicle manufacturers and has been largely adopted is "free wheeling". Simply stated, this consists of the provision of an overrunning clutch between the engine and transmission shaft permitting the car to coast when it is rolling faster than the engine is driving the transmission shaft. Free wheeling has certain advantages but has the disadvantage that the engine cannot be used for braking unless means is provided for manually eliminating the free wheeling feature.

This invention has for its salient object to provide a transmission so constructed and arranged that the drive can be manually controlled, if desired, but will also be automatically controlled in accordance with the torque requirements.

Another object of the invention is to provide automatic torque controlled driving connections so constructed and arranged that they can be incorporated in the ordinary variable speed transmission without changing the size of the transmission casing or the variable speed gearing.

Another object of the invention is to provide transmission mechanism so constructed and arranged that the car is started in the usual manner by the use of the ordinary gear shift lever and can then be automatically shifted to a position in which the variable speed connections will be controlled automatically by the torque requirements.

Another object of the invention is to provide a free wheeling structure so arranged that the car will automatically free wheel when rolling faster than the drive and furthermore, so arranged that by the use of the ordinary manually controlled selective gear shift lever the free wheeling feature will be cut out and the engine can be used as a brake.

Another object of the invention is to provide variable speed transmission mechanism having automatic torque controlled and manually controlled selective means so constructed and arranged that the automatic controlling connections will be positively eliminated when the manually controlled mechanism is in use.

Another object of the invention is to provide variable speed transmission mechanism having means arranged to prevent any "back rolling" of the car during shifting operations.

Further objects of the invention will appear from the following specification taken in connection with the drawings which form a part of this application, and in which Fig. 1 is a sectional elevation of transmission mechanism constructed in accordance with the invention;

Fig. 2 is a top plan view of the shifter bars and manual control for said bars, the shift lever being shown in section;

Fig. 3 is an enlarged sectional elevation taken substantially on line 3, 3 of Fig. 2;

Fig. 4 is an enlarged sectional elevation taken substantially on line 4, 4 of Fig. 2;

Fig. 5 is an enlarged sectional elevation taken through the automatic shifting mechanism;

Fig. 6 is a transverse sectional elevation taken substantially on line 6, 6 of Fig. 5;

Fig. 7 is a sectional elevation similar to Fig. 5 but showing in section the connections between the clutch member and shaft;

Fig. 8 is a sectional elevation taken substantially on line 8, 8 of Fig. 5 and showing the high speed automatic driving connections in operative position;

Fig. 9 is a sectional elevation taken substantially on line 9, 9 of Fig. 5 and showing the automatic second speed driving connections in the inoperative position corresponding to the position of the high speed connections shown in Fig. 8;

Fig. 10 is a sectional elevation taken substantially on line 8, 8 of Fig. 5 showing the high speed automatic driving connections in inoperative position;

Fig. 11 is a sectional elevation taken substantially on line 9, 9 of Fig. 5 but showing the second speed automatic driving connections in operative position;

Figs. 12 and 13 are sectional elevations taken substantially on lines 8, 8 and 9, 9 of Fig. 5 but showing the high speed automatic and second speed automatic both in inoperative position or in the position taken when the car is free wheeling;

Fig. 14 is a transverse sectional elevation taken through one end of the cluster gear and showing the mechanism for preventing back rolling of the car;

Fig. 15 is a sectional elevation similar to Fig. 6 but showing the automatic driving connection for second speed in operative position, whereas in Fig. 6 the high speed automatic connections are shown in operative position;

Fig. 16 is a sectional elevation similar to Fig. 6 but showing the automatic driving connections in inoperative or in neutral position; and Fig. 17 is a detail sectional elevation illustrating the means for preventing the operation of the automatic driving connections when the manually operated gear shift mechanism is being used.

The invention briefly described consists of a variable speed transmission incorporating the customary manually controlled three speed transmission mechanism and furthermore incorporating means for automatically shifting from a low speed, such as first speed, to automatic torque controlled transmission mechanism. The transmission furthermore includes torque controlled mechanism for automatically shifting from high to second speed and vice versa in accordance with torque requirements and means for positively preventing the operation of the torque controlled mechanism when the manually controlled mechanism is utilized. The transmission also includes a further mechanism for preventing back rolling of the car as, for instance, during the shifting from one speed to another. The automatic mechanism is, furthermore, so constructed and arranged that the car will free wheel when it is rolling faster than the drive from the engine and the free wheeling can be eliminated at will by a manual shift to second or low speed.

Further details of the invention will appear from the following description.

In the embodiment of the invention illustrated in the drawings the automatic shift or torque controlled shift and the free wheeling feature have been incorporated in the ordinary transmission case.

Referring particularly to Figs. 1 and 2 there is shown a transmission casing 20 having a cover 21 thereon. The drive shaft 22 from the engine extends into the front end of the transmission case and is mounted in suitable bearings 19. The end of the shaft which extends into the transmission case is recessed, as shown at 23, to receive the front end 24 of the driven shaft 25, this end being mounted in suitable roller bearings 26 disposed in the recesses 23.

The usual gear shift bars or rods A and B are slidably mounted in the cover or top casing 27 and are provided with notches and coacting non-positive selective plungers or balls 30.

The shifter bar A has three notches 31, 32 and 33 which, when engaged by the plunger 30, position the shifter bar respectively in a reverse drive, neutral and low speed drive. The shifter bar B has four notches 41, 42, 43 and 44 which position the bar respectively in manually controlled second gear drive, neutral, automatic drive and manual high speed drive, as hereinafter explained.

The shifter bars may be controlled in the usual manner by a gear shift lever 45 which has its lower end 46 disposed in a position to engage yokes or U-shaped brackets 47 and 48 which are formed on or are connected to the rear ends of the shifter bars A and B. A spring 49 is mounted in the yoke 47.

A plate 50 is pivotally mounted at 51 beneath the yokes 47 and 48 and is provided with an upwardly extending lug 52 and an upwardly extending resilient lug 53. A spring 54 is connected to one end of the plate 50 and normally tends to position the plate against a stop 55 shown in Fig. 2.

In order to start the car in low gear the shift lever 45 is tilted to a position in which the lower end 46 is disposed in the yoke 47. The shifter bar is then pulled backwardly toward the operator in the usual manner causing the bar to be moved forwardly, positioning the notch 33 in engagement with the plunger 30. The low speed gearing is then connected in the usual manner driving the shaft 25 at low speed.

If the shift lever 45 is tilted as far as possible into the yoke 47 against the pressure of the spring 49 the lower end 46 of the lever will engage the lug 52 when the lever is moved in a direction to move the shifter bar A to low speed position. This will cause the plate 50 to swing in an anti-clockwise direction about its pivot 51 placing the spring 54 under tension. In order to make plunger 30 inoperative when low gear is set for torque control automatic shift the movement of plate 50 is limited by a stop 56. The shifter rod A then does not move far enough to let plunger 30 enter the notch 33. If the operator then lets up on the gas so that the torque is decreased the spring 54 will pull the plate back to the position shown in full lines in Fig. 2 and disengage the low speed gearing and at the same time by the engagement of the lug 52 with the lower end 46 of the lever cause the shifter bar A to move back to neutral position. When this is taking place the lug 53 on the plate which is positioned in the lug 48 will cause the shifter bar B to be moved forward one notch or into a position in which the plunger 30 will engage the notch 43. When the shifter bar B is in this position the automatic shift to second or high can operate in the manner hereinafter described.

The gearing and driving connections in the transmission case will now be described. The rear end of the drive shaft 22 has formed thereon or connected thereto a gear 60 which meshes with a gear 61 carried by a sleeve 62 rotatably mounted on the countershaft 63. The sleeve 62 also has formed thereon gears 64, 65 and 66 which control respectively the second speed drive, low speed drive and reverse drive as hereinafter described.

In order to prevent back rolling of the car or, in other words, reverse rotation of the cluster gears formed on the sleeve 62, the gear 61 is recessed, as shown at 61', and is provided with annular scallops or corrugations 66'. A ring 67 is bolted to the casing 20 and is provided with recesses 68 in which are positioned rollers 69 which are pressed outwardly by springs 70. The recesses 68 are flat, as shown at 71, on one side thereof and are inclined, as shown at 72, on the other side. When the gear 61 tends to rotate backwardly the rollers 69 will be forced outwardly into the corrugations 66' by the inclined surfaces 72, thus locking the gear against reverse rotation.

The shaft 25 has splined thereon a gear 75 which is engaged by a clutch shifter yoke 76 carried by the shifter bar A. When the shifter bar A is moved to low speed position the gear 75 meshes with the gear 65. Gear 65 is made wide enough to mesh with gear 75 when the movement of shifter bar A is limited by stop 56. When this bar is moved to reverse speed position the gear 75 meshes with an idler gear of the usual construction which in turn meshes with the gear 66, thus reversing the drive. This type of gear shift is common and therefore further illustration and description thereof are deemed unnecessary.

The shaft 25 has rotatably mounted thereon a gear 80 which is disposed in constant mesh with the gear 64 and is adapted to drive the shaft 25 at second speed in a manner hereinafter described.

Referring particularly to Figs. 1, 5 and 6 there is shown in the shaft 25 a diametrical opening 81 in which are slidably mounted cap shaped plungers 82 and 83 having positioned therebetween a spring 84. The plungers are recessed at their outer ends, as shown at 85 and 86, and rollers 87 and 88 are positioned in the recesses. A ring 89 surrounds the rollers 87 and 88 and the shaft 25 and is rotatable to a limited extent relative thereto. The ring 89 is provided with recesses 90 and 91 in which the rollers 87 and 88 are positioned. These recesses are tapered or inclined, as shown at 92, and are provided with pockets 93 and 94 which in different positions of the drive are adapted to form seats for the rollers 87 and 88 in the manner hereinafter described. The plungers are so dimensioned that there is a slight clearance between the inner ends thereof when the rollers 87 and 88 are disposed in pockets 94.

The ring 89 in addition to enclosing the rollers 87 and 88 forms a cage or carrier for two other sets of rollers 95 and 96. Rollers 96 are positioned in an annular ring 100 formed on the inner end of the shaft 22 and the rollers 95 are positioned in an annular ring 101 formed on the gear 80. The rings 100 and 101 are internally corrugated or scalloped, as shown at 102.

The shaft 25 is provided within the ring 100 with recesses or grooves 105 having therein cams 106. When the rollers 96 are disposed in the grooves 105, as shown for instance in Fig. 10, the rollers will not be forced outwardly by the cams into the corrugations in the ring 101. However, when the shaft 25 is rotated relative to the ring 100 to a position in which the cams 106 engage the rollers 96 the rollers will be forced outwardly to seat in the corrugation depressions in ring 100. Also when the shaft and ring are so relatively positioned that rollers 95 are disposed on the outer surface of the shaft the rollers will be positioned in the depressions in corrugations in the ring 101, and the shaft and ring 101 will be clutched together in driving relation, as shown in Fig. 11.

The shaft 25 is also provided with lugs 115 and 116 which extend radially thereof in opposite directions and project through slots 117 and 118 formed in the ring 89. A clutch member 120 is slidably mounted on and splined to the shaft 25 through lugs 115 and 116 which engage slots 119 in the ring 120. Member 120 is provided at one side with clutch teeth 121 and on the opposite side with clutch teeth 122. The clutch teeth 121 are adapted to engage complementary teeth 123 formed on the gear 60 on shaft 22 and the clutch teeth 122 are adapted to engage complementary clutch teeth 124 formed on the gear 80. A shifting arm 125 engages the clutch member 120 and is carried by the shifter bar B.

The clutch member 120 is provided with a pair of diametrically opposite internal arcuate recesses or slots 130 and 131 in which are positioned blocks 132. Each block has a notch 133 and surfaces 134 and 135 on opposite sides of the notch (see Fig. 17). The ring 89 has lugs 136 disposed in the recesses 130 and 131 and as the ring 120 is adjusted longitudinally to engage clutch teeth 121 and 123 or 122 and 124 the lugs 136 are disposed respectively on opposite surfaces 134 and 135 of the blocks 132. The rollers 87 and 88 are then disposed in the portions 92 of recesses 90 and 91 and the rollers 95 and 96 are disposed in neutral position, as shown in Figs. 12 and 13.

Thus when the clutch member 120 is manually shifted to high or second speed, means is provided for positively preventing any driving engagement through the rollers 95 and 96.

When the clutch member 120 is disposed in automatic shift position with notch 43 of bar B engaged by plunger 30 the lugs 136 will be disposed opposite the notches 133 permitting the rollers 87 and 88 to enter pockets or steps 93 or 94 in which positions the drive will be completed through automatic direct or automatic second respectively.

*Operation*

The drive can be shifted manually to low, second and high in the usual manner. In shifting to low the shift lever 45 should be shifted or tilted far enough to enter yoke 47 but should not be pressed against spring 49.

When the shifter bar B and clutch member 120 are shifted to engage clutch teeth 122 and 124 for second speed or teeth 121 and 123 for high, the coaction of lugs 136 with surfaces 135 and 134 of block 132 prevents any possibility of rollers 95 and 96 transmitting the drive, as above explained.

The manual second speed drive is transmitted by shaft 22, gear 60, gear 61, sleeve 62, gear 64, gear 80, clutch teeth 124, 122, clutch member 120, lugs 115 and 116 to shaft 25.

Manual high speed drive is transmitted from shaft 22, through clutch teeth 123, 121, ring 120, lugs 115 and 116 to shaft 25.

*Automatic operation*

The shift lever 45 is tilted into the yoke or bracket 47 sufficiently far to compress spring 49 and when shifter bar A is shifted to low the lower end 46 of shift lever 45 will engage lug 52 and swing plate 50 to the dotted line position shown in Fig. 2. Spring 54 will thus be tensioned and when lever 45 is released the spring 54 will swing plate 50 back to full line position and will retract shifter bar A and disconnect low gear drive. Also lug 53 on plate 50 will move shifter bar B to a position in which notch 43 is engaged by plunger 30, or to automatic shift position. Shift lever 45 now stands in neutral position.

When shifter bar B has been moved to notch 43 the clutch member 120 is also moved and the surfaces 134 of blocks 133 will move from the path of lugs 136 on ring 89, permitting balls 87 and 88 to move from the position shown in Fig. 16 to the position shown in Figs. 6 or 15.

The relative movement between the ring 89 and shaft 25 causes cams 106 to force rollers 96 to engage ring 100, as shown in Fig. 8.

The drive is then automatic from shaft 22, through ring 100, rollers 96, ring 89, rollers 87 and 88, plungers 82 and 83 to shaft 25.

The torque tends to compress the spring 84 by the resistance of the driven shaft 25, plungers 82 and 83 and rollers 87 and 88 and to cause the rollers to enter pockets or steps 94 and if the torque becomes too great this takes place. When this occurs the rollers 96 will be released from ring 100 as in Fig. 10 and rollers 95 will engage ring 101. The release of rollers 96 and engagement of rollers 95 is due to the relative rotation between ring 89 and shaft 25.

Fig. 8 shows the relation of rollers 96 to ring 100 in direct drive and Fig. 9 shows the corresponding position of rollers 95 relative to ring 101. Attention is directed to the fact that the rollers 95 in Fig. 9 are disposed at one end of the openings in the ring 89, since ring 101 which is carried by second speed gear 80 is running slower than ring 89. In the interim between the time when rollers 96 are released by the movement of cams 106 away from the rollers and the time when the rollers 95 move out of grooves 110 on to the periphery of shaft 25, the shaft 25 slows down to a slight extent to synchronize with the speed of the gear 80 and ring 101 carried thereby. The rollers 95 are not locked to ring 101 until the speeds of ring 89 and ring 101 are synchronized. In Fig. 11 one of the rollers 95 is shown at X just prior to being locked in engagement with ring 101. Due to the fact that the openings in the ring 89 are longer than the widths of rollers 95 and to the slower speed of rotation of the second speed ring 101, the roller 95 will not be forced from position X into driving position until the shaft 25 and ring 89 are synchronized with ring 101 when the ring 101 will advance relative to shaft 25 and permit rollers 95 to move into driving position.

The second speed drive will continue until the gas feed is temporarily let up whereupon there will be a reversal of torque and the rollers 87 and 88 will again engage recesses 93 and the drive will shift back to high.

If the reversal of driving relation then continues the rollers 87 and 88 will engage inclined surfaces 90 and 91 and free wheeling will take place, as shown in Figs. 12 and 13, where neither set of rollers 95 or 96 is in driving relation to shaft 25. When the engine is speeded up and overcomes the rolling speed of the car the drive automatically shifts again to high. To eliminate free wheeling and use the engine as a brake the shift lever 45 is manually shifted to first, second or high speed position.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a drive shaft, a driven shaft, a plurality of sets of variable speed driving connections between said shafts, manually operable change speed means for selectively connecting said sets of driving connections between the shafts, for shifting from low speed to higher speed and vice versa, automatic torque controlled means for varying said driving connections at speeds above low speed and means for automatically shifting from a manually controlled low speed driving connection to an automatic torque controlled driving connection.

2. In combination, a drive shaft, a driven shaft, a relatively low speed driving connection between said shafts, manually operable control means for operatably connecting said driving connection and for manually shifting from low speed to higher speed and vice versa, automatic torque controlled driving connections between said shafts and automatically operating means including a spring actuated member placed under tension by said manually operable means for shifting from low speed driving connections to one of the torque controlled driving connections.

3. In combination, a drive shaft, a driven shaft, a member mounted on the driven shaft, rotatable relative thereto and held against relative longitudinal movement with respect thereto, and means controlled by said member when the member is in one relative position on the driven shaft for directly clutching the drive shaft to the driven shaft, and reduction gearing for transmitting the drive between the drive shaft and said member at a reduced speed in another position of said member on the driven shaft.

4. In combination, a drive shaft, a driven shaft, a member mounted on the driven shaft, rotatable relative thereto and held against relative longitudinal movement with respect thereto, and means controlled by said member when the member is in one relative position on the driven shaft for directly clutching the drive shaft to the driven shaft, reduction gearing for transmitting the drive between the drive shaft and said member at a reduced speed in another position of said member on the driven shaft, and torque controlled means for automatically shifting said member from direct drive position to reduced drive position on the drive shaft and vice versa.

5. In combination, a drive shaft, a driven shaft, a member mounted on the driven shaft and rotatable relative thereto but held against relative longitudinal movement with respect thereto, means between said drive shaft and member for transmitting direct drive thereto in one position of the member on the driven shaft, means between the drive shaft and member for transmitting reduced drive from the drive shaft to said member in another position of the member on the driven shaft, and means for operatively connecting the member to the driven shaft to transmit the drive therebetween.

6. In combination, a drive shaft, a driven shaft, a member mounted on the driven shaft and rotatable relative thereto but held against relative longitudinal movement with respect thereto, means between said drive shaft and member for transmitting direct drive thereto in one position of the member on the driven shaft, means between the drive shaft and member for transmitting reduced drive from the drive shaft to said member in another position of the member on the driven shaft, means for operatively connecting the member to the driven shaft to transmit the drive therebetween, and torque controlled means for automatically shifting said member on the driven shaft from direct drive position to the lower speed position thereon and vice versa.

7. In combination, a drive shaft, a driven shaft, a member rotatably adjustable but held against longitudinal movement on the driven shaft, means operatively connected to the drive shaft for rotating said member at direct driving speed, means operatively connected to the drive shaft for driving said member at a reduced speed, and torque controlled means for selectively engaging one or the other means with said member and for connecting the driven shaft to said member.

8. In combination, a drive shaft, a driven shaft, a drive transmitting member on the driven shaft, means for rotating said member at direct driving speed, means for rotating said member at reduced driving speed, and means connecting said member to the driven shaft, said last named means including means for automatically shifting from one of the driving connections to the member to the other driving connection in accordance with the torque requirements and for disconnecting both of said devices from said member when the driven shaft is rotating faster than said member.

9. In combination, a drive shaft, a driven shaft, a member on the driven shaft for transmitting the drive between the shafts in a plurality of variable speed driving positions of the member on the driven shaft, means for driving said member at direct drive in one position of the member on the driven shaft, means for driving said member at reduced speed in another position on the driven shaft, means to transmit the drive from the member to the driven shaft, torque controlled means for automatically shifting said member from a lower speed position on the driven shaft to a higher speed position and vice versa, and means in conjunction with the driving connections and shifting means for insuring the substantial synchronization of the lower speed drive connections and driven shaft before the said connections are operative.

10. In combination, a drive shaft, a driven shaft, means including a drive transmitting member for transmitting the drive between said shafts at a plurality of variable speeds, an element directly driven by the drive shaft at the same speed, an element operatively driven by the drive shaft at a relatively reduced speed, selective driving connections including rollers between each of said elements and said drive transmitting member, and automatically operating torque controlled means for selectively shifting the drive from one element to the other in accordance with torque requirements.

11. In combination, a drive shaft, a driven shaft, means including a drive transmitting member rotatably adjustable but held against longitudinal movement on the driven shaft for transmitting the drive between said shafts at a plurality of variable speeds, an element directly driven by the drive shaft, an element operatively driven by the drive shaft at a reduced speed, selective driving connections between each of said elements and said drive transmitting member, and automatically operating torque controlled means for selectively rotatably adjusting the drive transmitting member on the driven shaft and shifting the drive from one element to the other in accordance with torque requirements.

12. In combination, a drive shaft, a driven shaft disposed in alinement therewith, a rotatable drive transmitting member rotatably adjustable on the driven shaft but held against longitudinal movement thereon, a plurality of elements driven at different speeds by the drive shaft, selective means for clutching said elements to said member, means carried by the driven shaft for controlling said clutching means and means for transmitting the drive from the drive transmitting member to the driven shaft.

13. In combination, a drive shaft, a driven shaft disposed in alinement therewith, a rotatable drive transmitting member rotatably adjustable on the driven shaft but held against longitudinal movement thereon, a plurality of elements driven at different speeds by the drive shaft, selective means for clutching said elements to said member, means carried by the driven shaft and dependent on the relative positions of rotation of the member on the driven shaft for controlling said clutching means and means for transmitting the drive from the drive transmitting member to the driven shaft.

14. In combination, a drive shaft, a driven shaft disposed in alinement therewith, a rotatable drive transmitting member rotatably adjustable on the driven shaft but held against longitudinal movement thereon, a plurality of elements driven at different speeds by the drive shaft, selective means for clutching said elements to said member, torque responsive means carried by the driven shaft for controlling said clutching means and means for transmitting the drive from the drive transmitting member to the driven shaft.

15. In combination, a drive shaft, a driven shaft disposed in alinement therewith, a member mounted on the driven shaft and rotatable relative thereto but held against relative movement thereon, means between said drive shaft and member for transmitting a relatively high speed drive thereto in one position of the member on the driven shaft, means between the drive shaft and member for transmitting reduced drive from the drive shaft to said member in another position of the member on the driven shaft, and means for operatively connecting the member to the driven shaft to transmit the drive therebetween.

16. In combination, a drive shaft, a driven shaft, a drive transmitting member adjustably mounted on the driven shaft, means operable in one position of adjustment of the member on the driven shaft for rotating said member at a relatively high driving speed, means operable in another position of adjustment of the member on the driven shaft for rotating said member at reduced driving speed, torque controlled means for shifting said member from one position to another position on the driven shaft, and means connecting said member to the driven shaft, said last named means including means for disconnecting both of said drives from said member when the driven shaft is rotating faster than said member.

17. In combination, a drive shaft, a driven shaft, a plurality of sets of variable speed driving connections between said shafts, manually operable change speed means for selectively connecting said sets of driving connections between said shafts, said means including a shift lever and shifter bars, automatic torque controlled means for varying the said driving connections and means including a spring and shifter member placed under tension by the operation of the shift lever for automatically shifting from manual control to automatic control upon release of the shift lever.

18. In combination, a drive shaft, a driven shaft, a plurality of sets of variable speed driving connections between said shafts, manually operable change speed means for selectively connecting said sets of driving connections between said shafts, said means including a shift lever and shifter bars, automatic torque controlled means for varying said driving connections and means including a spring and shifter member operatable on the shifter bars and placed under tension by the operation of the shift lever for automatically shifting from manual control to automatic control upon release of the shift lever.

19. In combination, a drive shaft, a driven shaft, a plurality of sets of variable speed driving connections between said shafts, manually operable change speed means for selectively connecting said sets of driving connections between said shafts, said means including a shift lever and shifter bars, automatic torque controlled means for varying the said driving connections and means including a spring and shifter member placed under tension by the operation of the shift lever to a predetermined position for automatically shifting from manual control to automatic control upon release of the shift lever, said shift lever being operatable to another predetermined position to operate the low speed control shifter bar without placing said spring and shifter member under tension.

20. In combination, a drive shaft, a driven shaft, a drive transmitting member rotatably adjustable on the driven shaft, a plurality of elements driven at different speeds by the drive shaft, said elements having portions extending around the drive transmitting member, selective means for clutching said portions of said elements to said drive transmitting member in different positions of adjustment of the member on the driven shaft, torque responsive means for rotatably adjusting the drive transmitting member and controlling and automatically shifting said selective clutching means, and means for transmitting the drive from the drive transmitting member to the driven shaft.

21. In combination, a drive shaft, a driven shaft, a drive transmtting member rotatably adjustable on the driven shaft, a plurality of elements driven at different speeds by the drive shaft, said elements having portions extending around the drive transmitting member, selective means for clutching said portions of said elements to said drive transmitting member in different positions of adjustment of the member on the driven shaft, torque responsive means carried by the driven shaft for rotatably adjusting the drive transmitting member and controlling and automatically shifting said selective clutching means, and means for transmitting the drive from the drive transmitting member to the driven shaft.

22. In combination, a drive shaft, a driven shaft, a drive transmitting member rotatably adjustable on the driven shaft and held against longitudinal movement relative thereto, a plurality of elements driven at different speeds by the drive shaft, said elements having portions extending around the drive transmitting member, selective means including elements movable between said portions and said drive transmitting member to clutch said member and portions in driving relation to each other and means for transmitting the drive from the drive transmitting member to the driven shaft.

23. In combination, a drive shaft, a driven shaft, a drive transmitting member rotatably adjustable on the driven shaft, a plurality of elements driven at different speeds by the drive shaft, said elements having portions extending around the drive transmitting member, torque controlled selecting means including elements movable between said portions and said drive transmitting member to clutch said member and portions in driving relation to each other and means for transmitting the drive from the drive transmitting member to the driven shaft.

24. In combination, a driven shaft, a rotatable clutch control and drive transmitting ring mounted on said shaft, torque responsive means coacting between said driven shaft and ring to move the ring to a plurality of positions circumferentially on said shaft, a plurality of drive elements arranged to be clutched to said driven shaft in varied positions of said clutch ring, and selective means between the driven shaft and drive elements for clutching said parts together.

25. In combination, a driven shaft, a rotatable clutch control and drive transmitting ring mounted on said shaft, torque responsive means coacting between said driven shaft and ring to move the ring to a plurality of positions circumferentially on said shaft, a plurality of drive elements arranged to be clutched to said driven shaft in various positions of said clutch ring, and rollers between the driven shaft and drive elements for clutching said parts together.

26. In combination, a driven shaft, a rotatable clutch control ring mounted on said shaft, torque responsive means coacting between said driven shaft and ring to move the ring to a plurality of positions circumferentially on said shaft, a plurality of drive elements arranged to be clutched to said driven shaft in various positions of said clutch ring on the driven shaft, and selective means controlled by said ring and disposed between the driven shaft and drive elements for clutching said parts together.

EMIL ANDERSON.